(12) United States Patent
Tamura

(10) Patent No.: US 12,120,409 B2
(45) Date of Patent: Oct. 15, 2024

(54) IMAGE CAPTURING APPARATUS HAVING A FAN AND FOREIGN SUBSTANCE REMOVER

(71) Applicant: CANON KABUSHIKI KAISHA, Tokyo (JP)

(72) Inventor: Koji Tamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,461

(22) Filed: Nov. 10, 2022

(65) Prior Publication Data

US 2023/0156308 A1    May 18, 2023

(30) Foreign Application Priority Data

Nov. 15, 2021 (JP) ................................. 2021-185818

(51) Int. Cl.
| H04N 23/52 | (2023.01) |
| H04N 23/54 | (2023.01) |
| H04N 23/667 | (2023.01) |
| H04N 23/81 | (2023.01) |

(52) U.S. Cl.
CPC ............ *H04N 23/52* (2023.01); *H04N 23/54* (2023.01); *H04N 23/667* (2023.01); *H04N 23/811* (2023.01)

(58) Field of Classification Search
None
See application file for complete search history.

(56) References Cited

U.S. PATENT DOCUMENTS

| 2004/0047625 | A1* | 3/2004 | Ito | G03B 17/48 |
| | | | | 348/E5.078 |
| 2008/0049136 | A1* | 2/2008 | Ishibashi | H04N 23/52 |
| | | | | 348/E5.022 |
| 2009/0244363 | A1* | 10/2009 | Sugimura | H04N 23/60 |
| | | | | 348/E5.025 |
| 2012/0268642 | A1* | 10/2012 | Kawai | H04N 23/54 |
| | | | | 359/554 |
| 2014/0055623 | A1* | 2/2014 | Okada | H04N 23/634 |
| | | | | 348/177 |

FOREIGN PATENT DOCUMENTS

| JP | 2004264580 A | | 9/2004 |
| JP | 2007274663 A | | 10/2007 |
| JP | 2009071516 A | * | 4/2009 |
| JP | 2017228876 A | | 12/2017 |

\* cited by examiner

*Primary Examiner* — Quan Pham
(74) *Attorney, Agent, or Firm* — Canon U.S.A., Inc. IP Division

(57) ABSTRACT

An image capturing apparatus includes an image capturing element, a fan, a foreign substance removal unit, and a control unit. The fan generates airflow for cooling the image capturing element. The foreign substance removal unit removes a foreign substance from an exposure surface of the image capturing element on an object side of an imaging plane. The control unit operates the foreign substance removal unit to remove a foreign substance adhered to the exposure surface after driving the fan.

15 Claims, 12 Drawing Sheets

IMAGE CAPTURING APPARATUS HAVING A FAN AND FOREIGN SUBSTANCE REMOVER

BACKGROUND

Field

The present disclosure relates to an image capturing apparatus that includes a heat dissipation structure for dissipating heat generated from a heat generating source.

Description of the Related Art

Recently, miniaturization and high density of components mounted inside an electronic device have become remarkable due to a demand for miniaturization of the device.

Meanwhile, a demand for higher functionality of an image capturing apparatus, particularly higher performance of moving image functions, has been increasing, so that the amount of heat generated in the apparatus tends to increase.

In a case where a moving image is captured in a high temperature environment, there is a high possibility that a rise in temperature inside the image capturing apparatus will cause mounted components to malfunction or deteriorate in performance, and eventually results in a malfunction of the image capturing apparatus.

Recently, an image capturing apparatus that performs blur correction by moving an image capturing element in a direction perpendicular to an optical axis direction has become widely used in order to improve image quality.

The image capturing apparatus that performs the above-described blur correction is also required to have sufficient heat dissipation performance since the heat generated by the image capturing element may affect the image quality at the time of driving a blur correction mechanism and the time of continuous imaging and moving image capturing.

Thus, in a case where an amount of heat dissipation by natural heat dissipation is not sufficient as compared to an amount of heat generated in an image capturing apparatus, a heat dissipation structure that uses forced air cooling by a fan is used.

According to Japanese Patent Application Laid-Open No. 2017-228876, an apparatus is discussed that generates convection of air taken into the apparatus by a fan and cools an image capturing element and a circuit board with a heat sink for the image capturing element and a heat sink for the circuit board that face each other.

In an image capturing apparatus using an image capturing element, an optical low-pass filter and an infrared ray cut filter are arranged on an object side of the image capturing element. It is known that in a case where a foreign substance such as dust adheres to a filter surface, the portion where the foreign substance has adhered is captured in an image as a black spot and deteriorates the quality of the captured image.

Japanese Patent Applications Laid-Open No. 2007-274663 discusses techniques for vibrating a cover glass to shake off adhered dust. Moreover, as a conventional technique to address this issue, Japanese Patent Applications Laid-Open No. 2004-264580 discusses techniques for shaking off adhered dust by vibrating a cover glass.

However, the apparatus discussed in Japanese Patent Application Laid-Open No. 2017-228876 can obtain a cooling effect using the fan, but the convection of the air inside the apparatus causes dust and dirt in the apparatus to fly up and adhere to a surface of the image capturing element.

Further, according to the apparatuses discussed in Japanese Patent Applications Laid-Open No. 2004-264580, only a relationship between an image capturing operation and an operation member of the image capturing apparatus is discussed regarding timing of dust removal, and timing of operation of the fan is not indicated.

SUMMARY

An aspect of the present disclosure is directed to the provision of an image capturing apparatus that can efficiently remove a foreign substance such as dust adhered to an image capturing element at effective timing while securing heat dissipation performance.

According to an aspect of the present disclosure, an image capturing apparatus includes an image capturing element, a fan configured to generate airflow for cooling the image capturing element, a foreign substance removal unit configured to remove a foreign substance from an exposure surface of the image capturing element on an object side of an imaging plane, and a control unit configured to operate the foreign substance removal unit to remove a foreign substance adhered to the exposure surface after driving the fan.

Further features of the present disclosure will become apparent from the following description of exemplary embodiments with reference to the attached drawings.

DESCRIPTION OF THE EMBODIMENTS

Figure 1:
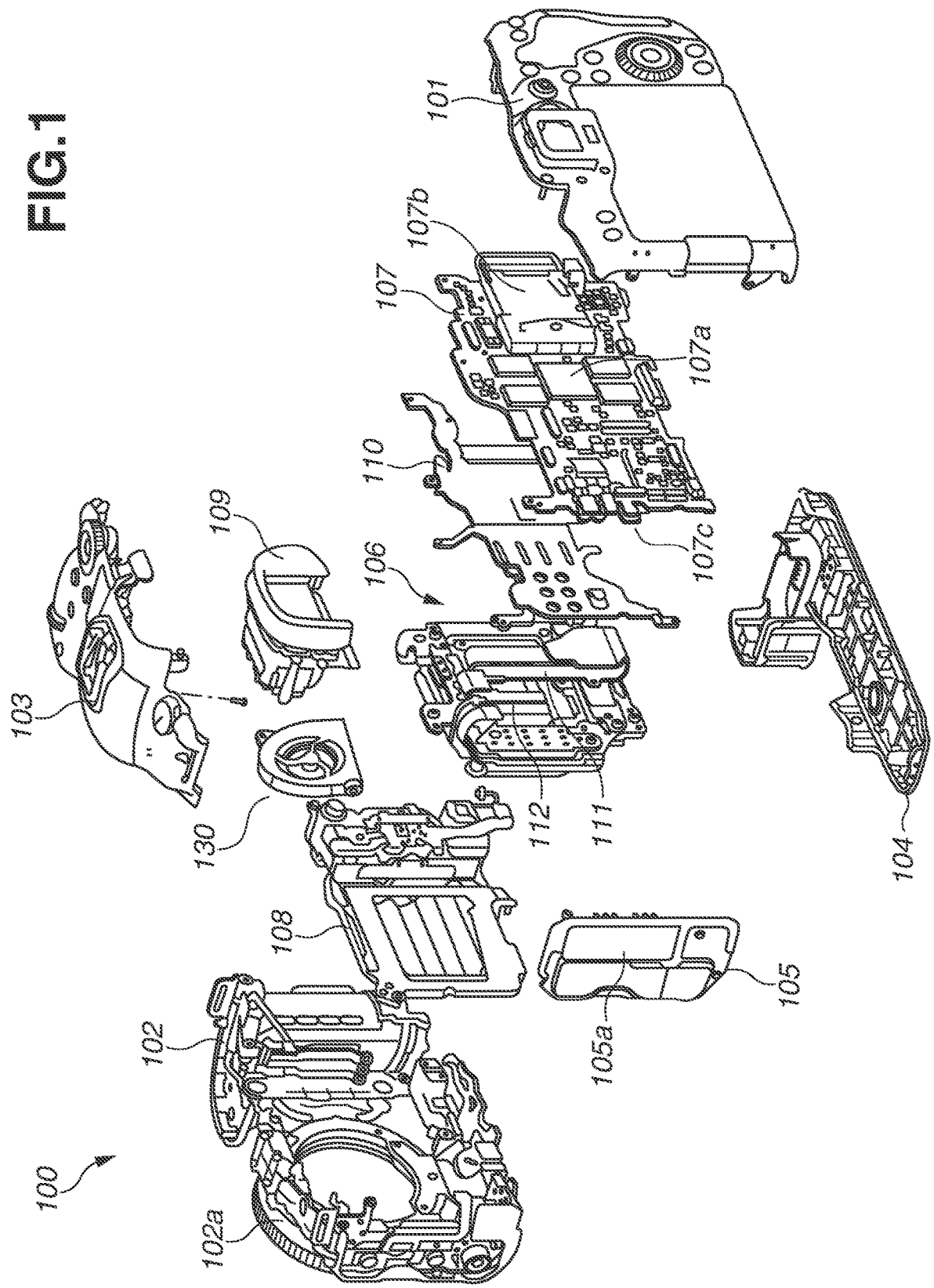
FIG. 1 illustrates a digital camera according to an exemplary embodiment of the present disclosure.

Exemplary embodiments of a technique according to the present disclosure will be described in detail below with reference to the attached drawings.

However, dimensions, materials, and shapes of components and their relative arrangements described below are to be changed as appropriate depending on the configuration and various conditions of an apparatus to which the present disclosure is applied.

Thus, the exemplary embodiments described below are not intended to limit the scope of the present disclosure thereto.

Commonly known techniques or the techniques in the public domain can be applied to a configuration and a process that are not particularly illustrated or described herein. In addition, redundant descriptions may be omitted.

In the drawings, the same or functionally similar elements are denoted by the same reference numerals.

Description of Exploded Rear Perspective View of Digital Camera 100

A first exemplary embodiment is described. FIG. 1 is an exploded rear perspective view of a digital camera 100 as an image capturing apparatus according to the present disclosure.

As illustrated in FIG. 1, the digital camera 100 includes a rear cover 101, a front base 102, a top cover 103, a bottom cover 104, and a side cover 105.

An image capturing element unit 106 that includes an image blur correction mechanism, a main board 107, a shutter 108, a finder 109, and a chassis 110 are arranged inside the digital camera 100.

The image capturing element unit 106 includes a movable unit 114 that includes an image capturing element 115 and a fixed unit and is arranged perpendicular to an optical axis.

The front base 102 is formed by using, for example, a magnesium die cast and a resin and includes a mount 102a for mounting an interchangeable lens.

The main board 107 includes a multi-layer substrate, and electronic components are mounted on both sides thereof. The main board 107 is fixed to the front base 102 and the metal chassis 110 with screws.

On the main board 107, a control integrated circuit (IC) 107a for controlling an image capturing signal, a connector 107b for a storage medium for storing an external storage medium, and an external communication terminal 107c for connecting a connection cable to an external apparatus are mounted.

The external communication terminal 107c is covered with a terminal cover 105a.

The image capturing element unit 106 is a member that particularly consumes a large amount of power and generates a large amount of heat among the components of the digital camera 100, and the temperature of the member rises sharply.

An image capturing time length of the digital camera 100 is limited by an operation guarantee temperature of each member.

In order to maintain the image capturing time length as long as possible, it is necessary to take a measure to release the heat generated by the image capturing element unit 106, which is a heat generating source, so that the temperature does not exceed the operation guarantee temperature.

The image capturing element unit 106 is fixed to the front base 102 with screws, and the heat of the image capturing element unit 106 is released to the front base 102.

A heat dissipation fan 130 is arranged near the image capturing element unit 106 such that an air blowing direction is perpendicular to the optical axis. Air flows along the rear surface of the image capturing element unit 106, which is the heat generating source, and prevents the image capturing element unit 106 from becoming locally hot (details will be described below).

According to the present exemplary embodiment, a centrifugal fan is used as the heat dissipation fan 130 serving as a blowing unit. However, the fan is not limited to this and, for example, an axial flow fan and the like can be used as long as heat dissipation can be achieved.

The main board 107 is also one of the heat generating sources, so that the heat dissipation fan 130 is arranged to face a ventilation opening 131a (see FIGS. 3B, 11A, and 11B) such that air blows between the image capturing element unit 106 and the main board 107, thereby producing the heat dissipation effect on a plurality of the heat generating sources.

However, the ventilation opening 131a of the heat dissipation fan 130 is arranged at a position closest to the image capturing element unit 106 that generates more heat.

Detailed Description of Image Capturing Element Unit 106

Figure 2A:
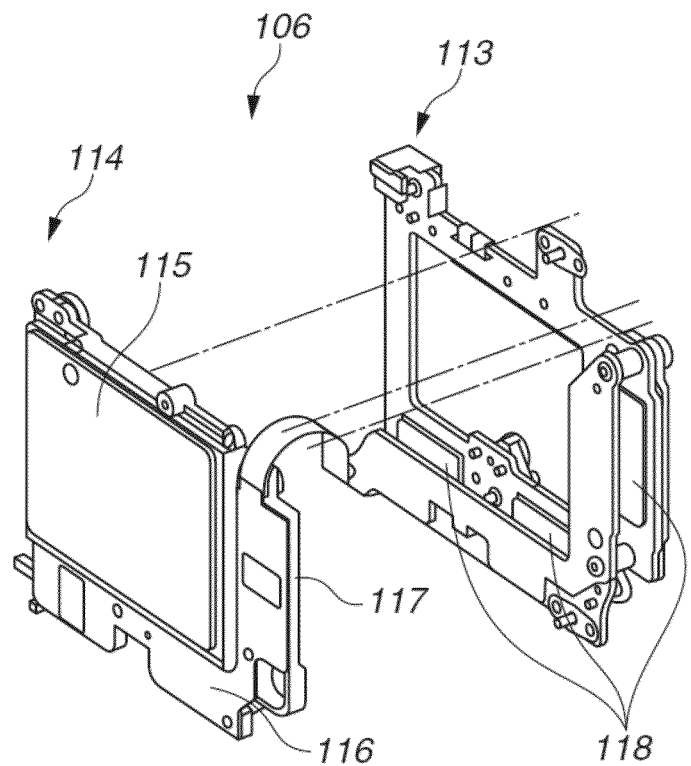
FIGS. 2A and 2B are an exploded front perspective view and an exploded rear perspective view of an image capturing element unit, respectively, according to the exemplary embodiment of the present disclosure.
Figure 2B:
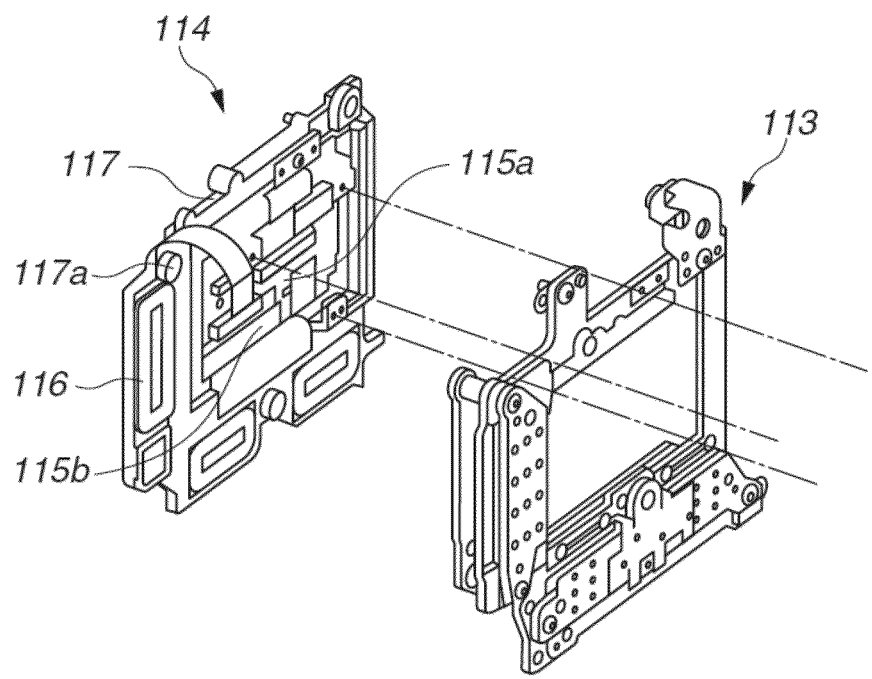

The image capturing element unit 106 is described in detail with reference to FIGS. 2A and 2B. FIGS. 2A and 2B are an exploded front perspective view and an exploded rear perspective view of the image capturing element unit 106, respectively.

A movable unit 114 includes a coil unit 116 in which a coil and a Hall element for moving an image capturing element 115 are arranged and is held by a sensor holder 117.

Three magnets 118 are held on a drive mechanism 113, and the movable unit 114 is attracted to and held by the magnets 118.

A ball (not illustrated) is placed in a ball holding unit 117a provided in the sensor holder 117 between the movable unit 114 and the drive mechanism 113.

The movable unit 114 can be moved by changing the amount of energization to the coil unit 116. Hand shake correction can be performed by moving the movable unit 114 in a direction where a shake of the main body of the digital camera 100 is canceled.

In the image capturing element 115, a sensor chip (not illustrated) is bonded to an image capturing board 115a on which an image capturing circuit is mounted and is electrically connected to the image capturing board 115a by wire bonding.

The image capturing element 115 and the sensor holder 117 are bonded and fixed to each other with an adhesive. Elements (not illustrated) 115b such as a capacitor, a resistor, and a regulator of the image capturing circuit are mounted on the back of the surface of the image capturing board 115a where the sensor chip is attached.

The image capturing element unit 106 and the main board 107 are electrically connected to each other using a flexible wiring board.

An image capturing signal flexible wiring board 111 (FIG. 1) is provided with wiring for an image capturing signal output from the image capturing element 115 and for a control signal necessary for driving the image capturing element 115, and the signals are transmitted to the control IC 107a on the main board 107.

An image capturing power supply flexible wiring board 112 (FIG. 1) is a flexible wiring board that supplies power for driving the image capturing element 115. An inter-board connector is used for connecting the image capturing board 115a and each of the flexible wiring boards.

Figure 10:
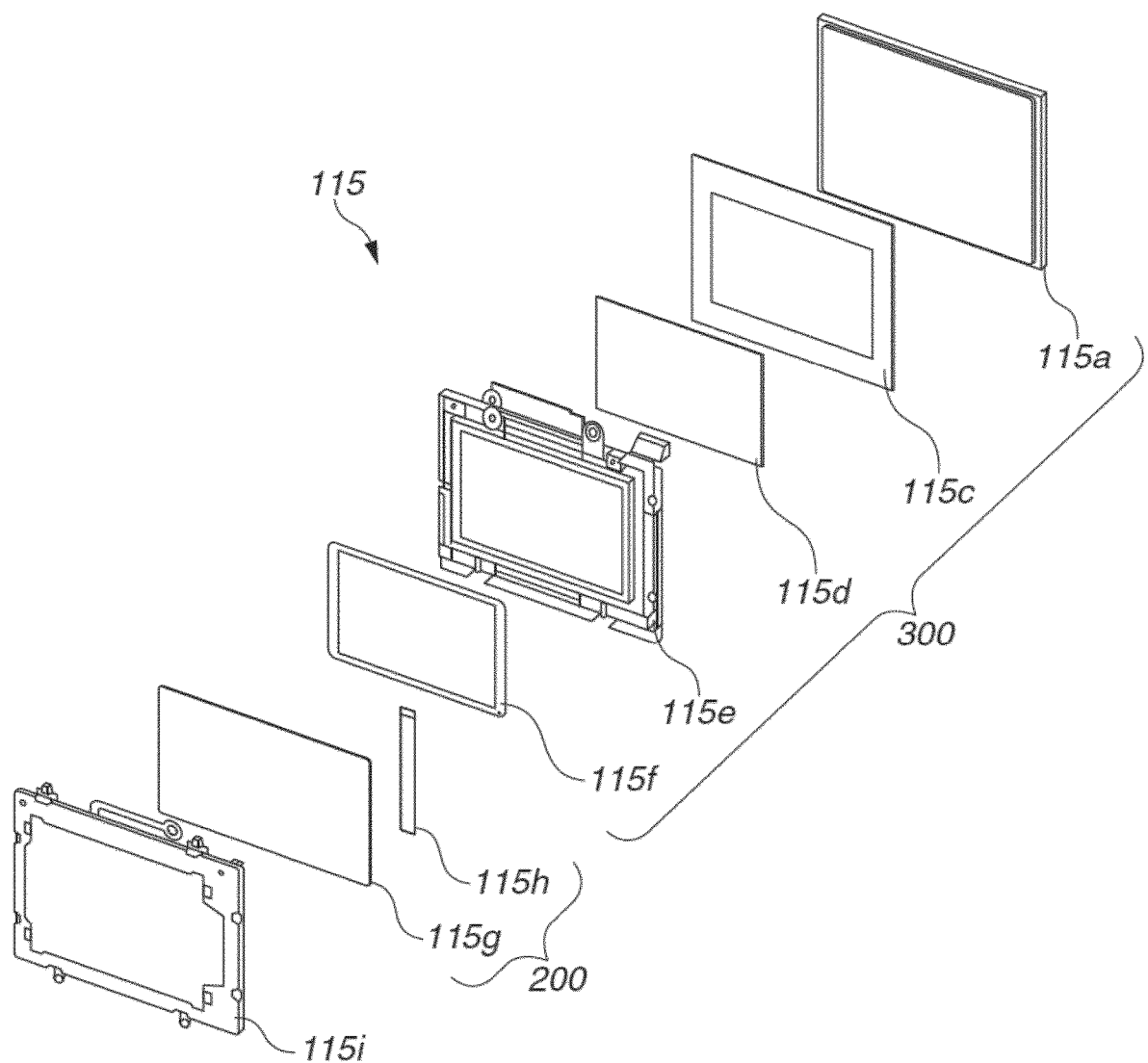
FIG. 10 is an exploded perspective view of an image capturing element according to the exemplary embodiment of the present disclosure.

The image capturing element 115 includes a foreign substance removal unit 200 for removing dust adhered to the surface and is described with reference to an exploded perspective view of the image capturing element 115 in FIG. 10.

The image capturing element 115 includes an imaging unit 300 (FIG. 10), a vibration unit 200 (also referred to as a foreign substance removal unit 200), and an urging member 115i.

Light-shielding members 115c and 115f each have an opening corresponding to an effective area of the image capturing board 115a.

An optical low-pass filter 115d is a known optical low-pass filter that cuts a signal in a high frequency region.

An image capturing element holding member 115e is made of a resin member having an opening corresponding to the effective area of the image capturing board 115a, and an elastomer is integrally formed around the entire peripheral edge portion of the opening portion.

A cover glass 115g is coated with an optical coating such as infrared block coating and antireflection coating.

A piezoelectric element 115h is a known piezoelectric element and is fixed to the cover glass 115g by means such as a conductive adhesive.

The piezoelectric element 115h expands and contracts when a predetermined frequency voltage is applied thereto. With the expansion and contraction of piezoelectric element 115h, flexion deformity periodically occurs in the cover glass 115g, and thus dust and the like are shaken off from the cover glass 115g.

The urging member 115i urges and fixes the imaging unit 300 and the vibration unit 200 described above to the image capturing board 115a fixed to the sensor holder 117.

The urging member 115i and the elastomer of the image capturing element holding member 115e form a sealed space for preventing a foreign substance such as dust from entering in the image capturing element 115.

Description of Rear View of Heat Dissipation Fan 130 and Image Capturing Element Unit 106

Figure 3A:
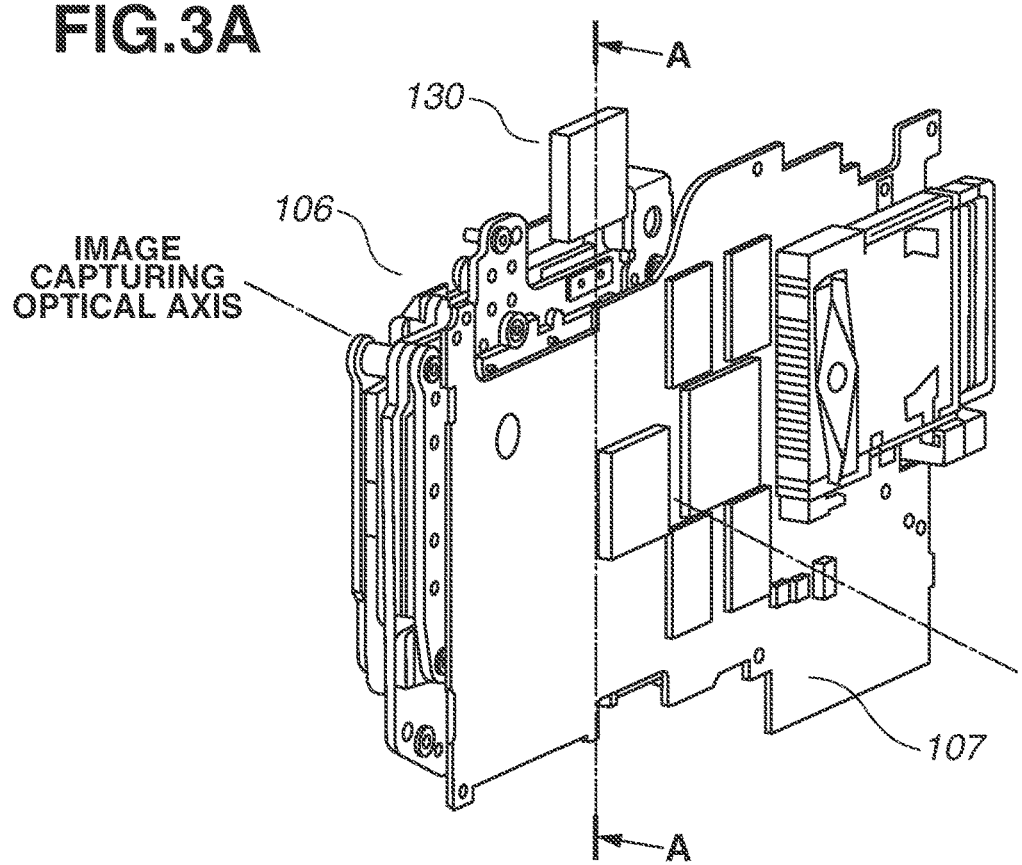
FIGS. 3A and 3B are a rear view and a sectional view illustrating the image capturing element unit and a heat dissipation fan according to the exemplary embodiment of the present disclosure.
Figure 3B:
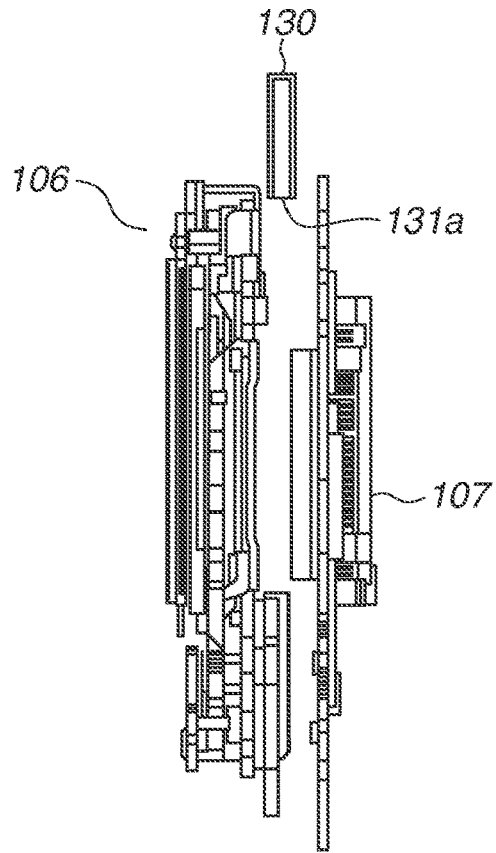
Figure 12:
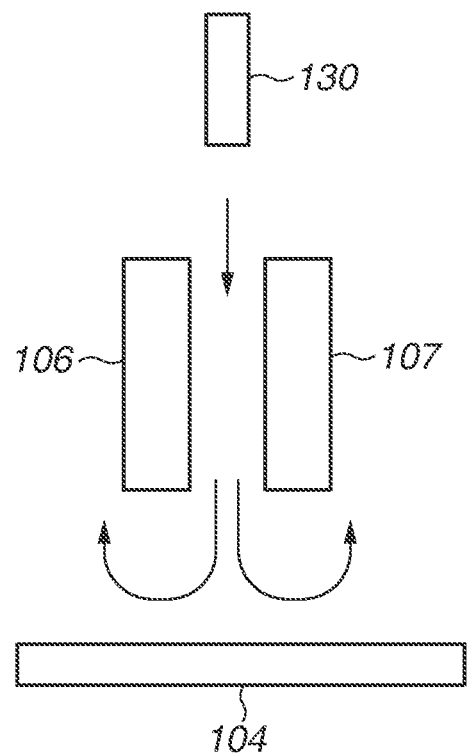
FIG. 12 is a schematic view illustrating the heat dissipation fan and the image capturing element unit when viewed from the rear according to the exemplary embodiment of the present disclosure.

FIG. 3A is a perspective view illustrating a positional relationship of the heat dissipation fan 130, the image capturing element unit 106, and the main board 107. FIG. 3B is a cross-sectional view along an A-A line in FIG. 3A. FIG. 12 is a schematic diagram illustrating a flow of air (airflow).

Figure 11A:
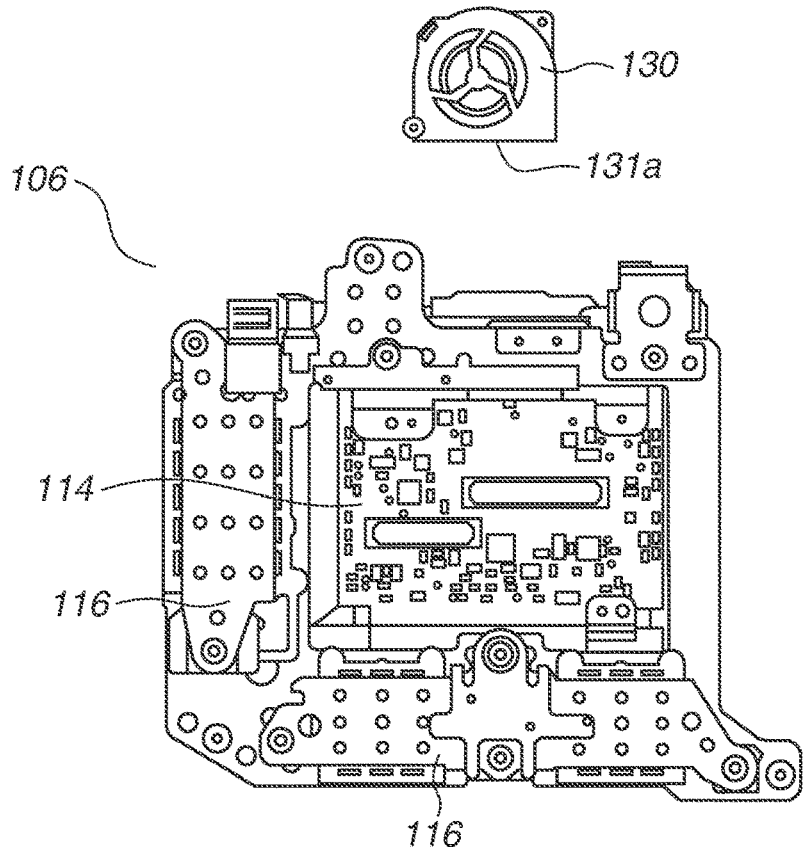
FIGS. 11A and 11B are a rear view and a schematic view illustrating the heat dissipation fan and the image capturing element unit according to the exemplary embodiment of the present disclosure.
Figure 11B:
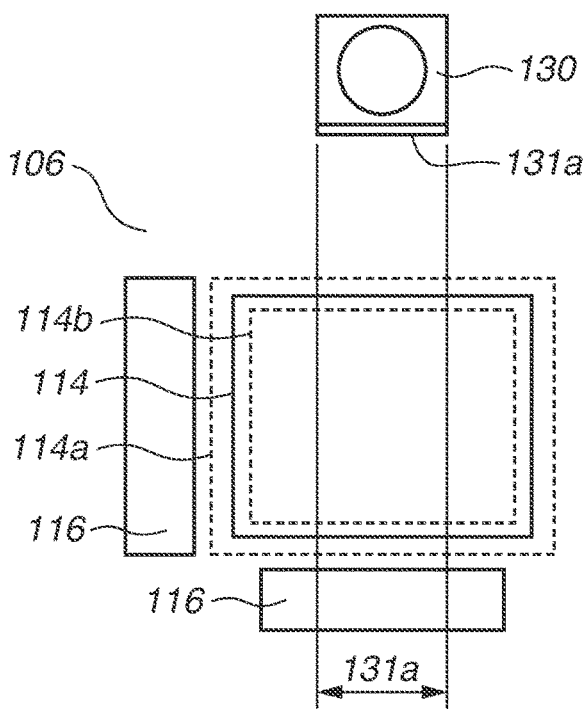

FIGS. 11A and 11B are a rear view and a schematic view illustrating the heat dissipation fan 130 and the image capturing element unit 106.

In FIGS. 3A and 3B, the heat dissipation fan 130 is arranged between the image capturing element unit 106 and the main board 107 such that the ventilation opening 131a is substantially perpendicular to an image capturing optical axis.

Accordingly, air (airflow) passes between the image capturing element unit 106 and the main board 107 as illustrated in FIG. 12 and thus can prevent the image capturing element unit 106, which is the heat generating source, from becoming locally hot.

At the same time, the flow of air can also produce the heat dissipation effect on the main board 107, which is one of the heat generating sources.

Further, the air (airflow) having passed between the image capturing element unit 106 and the main board 107 is swirled up by the bottom cover 104 as illustrated by the arrows in FIG. 12 and is caused to circulate inside a housing.

The ventilation opening 131a does not necessarily need to be perpendicular to the image capturing optical axis. It is possible to increase the heat dissipation effect by tilting the ventilation opening 131a with respect to the image capturing optical axis to cause the air (airflow) to be applied more strongly to the image capturing element unit 106.

Next, movement of the movable unit 114 of the image capturing element unit 106 and a positional relationship with respect to the heat dissipation fan 130 are described. The movable unit 114 can move perpendicular to the optical axis in a movement range 114a illustrated in FIG. 11B.

Further, a range 114b indicates a range in which the movable unit 114 always exists if the movable unit 114 moves. The range 114b is, in other words, a range in which the movable unit 114 exists even if the movable unit 114 moves to any position in the movement range 114a.

Specifically, the ventilation opening 131a of the heat dissipation fan 130 is directed so that the air is blown to the range 114b in which the movable unit 114 always exists when the movable unit 114 moves.

An air blowing direction 131a is schematically illustrated in FIG. 11B. Since the air blowing direction 131a is within the range 114b, the heat dissipation effect can be produced regardless of the position of the movable unit 114, which is the heat generating source in the image capturing element unit 106.

Further, the heat dissipation fan 130 is not physically connected to the movable unit 114, so that the heat dissipation effect can be produced without impairing the hand shake correction function due to the movement.

According to the first exemplary embodiment, for example, the heat dissipation fan 130 is operated at a wind speed of 4.5 L/min.

The "liter per minute" (L/min) is a unit of a volumetric flow rate. The heat dissipation fan 130 incorporated in the digital camera 100 can cause the maximum achievable temperature of the image capturing element unit 106 to be lowered by 10° C.

Accordingly, the rise in the temperature of the heat generating source is prevented, and the digital camera 100 is less likely to reach a limit temperature at which the functions of the digital camera 100 stop due to heat generation.

Description of Block Diagram Illustrating Configuration Example of Digital Camera 400

Figure 4:
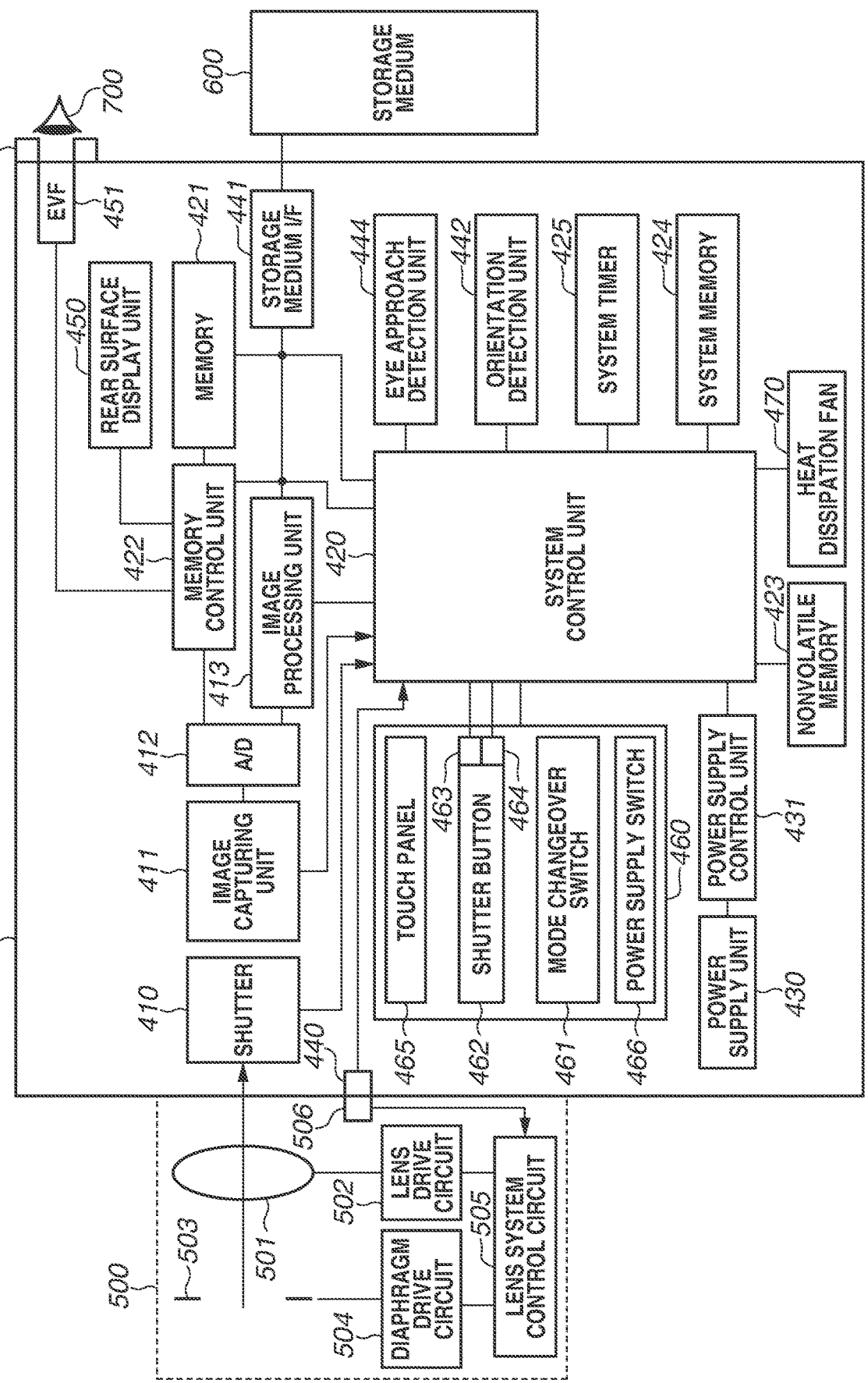
FIG. 4 is a block diagram illustrating a digital camera according to the exemplary embodiment of the present disclosure.

FIG. 4 is a block diagram illustrating a configuration example of a digital camera 400 (also referred to as an image capturing apparatus 400) according to the present exemplary embodiment.

A shutter 410 is a focal-plane shutter that can freely control an exposure time of an image capturing unit 411 described below. The control is performed by a system control unit 420 described below.

The image capturing unit 411 is an image capturing device that has an imaging plane on which an object image (an optical image) having passed through a lens 501 is formed and outputs an electrical signal (an analog signal) photoelectrically converted from the optical image formed on the imaging plane.

As the image capturing unit 411, a charge couple device (CCD) sensor or a complementary metal oxide semiconductor (CMOS) sensor is used.

An analog-to-digital (A/D) converter 412 is a signal conversion unit that is used to convert an analog signal output from the image capturing unit 411 into a digital signal.

An image processing unit 413 generates image data by performing predetermined pixel interpolation, resizing processing such as reduction, and color conversion processing on the digital signal from the A/D converter 412 or a digital signal from a memory control unit 422 described below.

The system control unit 420 controls the position of a diaphragm and the position of the lens 501 based on a calculation result obtained by the image processing unit 413.

The image processing unit 413 further performs calculation processing using the above-described image data and through-the-lens (TTL) automatic white balance (AWB) processing based on the obtained calculation result.

The system control unit 420 is a control unit that includes at least one processor or circuit and controls the entire digital camera 400.

The system control unit 420 executes a program stored in a nonvolatile memory 423, which is described below, and thus realizes each processing according to the present exemplary embodiment.

A memory 421 is a storage unit that temporarily stores the digital signal obtained by the A/D converter 412 converting the analog signal obtained by the image capturing unit 411 and the image data generated by the image processing unit 413.

The memory 421 has a storage capacity sufficient to store a predetermined number of still images, moving images and sound of a predetermined time length.

The memory control unit 422 is a memory control unit that controls transmission and reception of data controlled by the system control unit 420 to and from the A/D converter 412, the image processing unit 413, and the memory 421.

The digital signal output from the A/D converter 412 is directly written to the memory 421 via the image processing unit 413 and the memory control unit 422 or only via the memory control unit 422.

The nonvolatile memory 423 is an electrically erasable/recordable read-only storage unit and stores a constant, a program, and the like for operation of the system control unit 420.

A system memory 424 is a readable and writable storage unit that stores a constant and a variable for the operation of the system control unit 420, a program read from the nonvolatile memory 423, and the like.

A system timer 425 is a time measurement unit that measures a time until auto power-off for turning off various display members, which are described below, is executed and also measures an exposure time.

The auto power-off has a function of turning off the various display members, which are described below, in a case where it is determined that a photographer has not operated the digital camera 400 in order to suppress battery consumption.

A power supply unit 430 includes a primary battery such as an alkaline battery and a lithium (Li) battery, a secondary battery such as a nickel-cadmium (NiCd) battery, a nickel-metal hydride (NiMH) battery and Li battery, and an alternate current (AC) adapter.

A power supply control unit 431 includes a circuit for detecting the power supply unit 430, which is an electrical power source for driving the digital camera 400, a direct current to direct current (DC-DC) converter, and a switch circuit for switching a power supply destination.

The power supply unit 430 detects whether the battery is installed, a type of battery, and the remaining amount of battery.

Further, the power supply control unit 431 controls the DC-DC converter based on the detection result and an instruction from the system control unit 420 to supply a required voltage to the supply destination at a required timing.

A communication terminal 440 is provided in the digital camera 400 and is electrically connected to a lens communication terminal 506 described below.

The communication terminal 440 is electrically connected to the lens communication terminal 506, and thus the system control unit 420 that controls the entire digital camera 400 can communicate with a lens unit 500 described below.

A storage medium interface (I/F) 441 is an interface with a storage medium 600 described below.

An orientation detection unit 442 detects an orientation of the digital camera 400 with respect to the direction of gravity.

The orientation detection unit 442 can output orientation information indicating whether the image captured by the image capturing unit 411 is an image captured with the digital camera 400 held horizontally or an image captured with the digital camera 400 held vertically, based on the detected orientation.

The system control unit 420 can add the orientation information output from the orientation detection unit 442 to the image data.

As the orientation detection unit 442, an acceleration sensor, a gyro sensor, or the like can be used.

In a case where the acceleration sensor or the gyro sensor is used as the orientation detection unit 442, the orientation detection unit 442 can also detect operation of the digital camera 400 (pan, tilt, lifted, motionless, and the like).

An eyepiece unit 443 is a portion of the digital camera 400 where an eye (object) 700 of a photographer approaches, i.e., is proximate to the digital camera 400.

An eye approach detection unit 444 is an eye approach detection sensor that detects the approach (proximity) and separation (departing) of the eye 700 to and from the eyepiece unit 443.

The eye approach detection unit 444 detects whether the eye 700 has approached the eyepiece unit 443 depending on whether a light-receiving portion of an infrared proximity sensor (not illustrated) receives light.

After it is detected that the eye 700 has approached the eyepiece unit 443, the system control unit 420 determines that the eyepiece unit 443 is in an eye approach state until the separation of the eye 700 from the eyepiece unit 443 is detected.

After it is detected that the eye 700 has separated from the eyepiece unit 443, the system control unit 420 determines that the eyepiece unit 443 is in a non-eye-approach state until the approach of the eye 700 is detected.

The infrared proximity sensor is merely an example, and another sensor can be adopted to the eye approach detection unit 444 as long as the sensor can detect the approach of an eye or an object and determine that the eye is proximate to the eyepiece unit 443.

The above-described memory 421 also serves as a memory (a video memory) for image display.

The digital signal and the image data written to the memory 421 are displayed by a rear surface display unit 450 and an electronic viewfinder (EVF) 451 via the memory control unit 422.

The rear surface display unit 450 performs display corresponding to the signal from the memory control unit 422.

In a case where the eye approach detection unit 444 detects the approach of the eye 700, the EVF 451 performs display corresponding to the signal from the memory control unit 422.

The digital signal that is obtained by the A/D converter 412 performing A/D conversion on the analog signal generated in the image capturing unit 411 and stored in the memory 421 is sequentially transmitted to the rear surface display unit 450 or the EVF 451 and displayed thereon.

Accordingly, live-view imaging display, which is real-time display, can be performed.

The system control unit 420 switches display (a display state)/non-display (a non-display state) of each of the rear surface display unit 450 and the EVF 451 in response to a state detected by the above-described eye approach detection unit 444.

In the non-eye-approach state, the rear surface display unit 450 performs display, and the EVF 451 is brought into the non-display state.

On the other hand, in the eye approach state, the EVF 451 performs display, and the rear surface display unit 450 is brought into the non-display state.

An operation unit 460 includes various operation members as an input unit for receiving an operation from a user.

The operation unit 460 includes various operation members (a mode changeover switch 461, a shutter button 462, a first shutter switch 463, a second shutter switch 464, a touch panel 465, and a power supply switch 466), which are described below.

Further, the operation unit 460 is an operation unit for inputting various operation instructions to the system control unit 420.

The mode changeover switch 461 is an image capturing mode switching unit for switching an operation mode of the system control unit 420 to any of a still image mode and a moving image mode.

Image capturing modes included in the still image mode are an auto image capturing mode, an auto scene determination mode, and a manual image capturing mode.

The still image mode further includes an aperture priority (Av) mode (Av mode), a shutter speed priority mode (Time-value (Tv) mode or Tv mode), and a programmed automatic exposure (AE) mode (P mode) as the image capturing modes.

Similarly, the moving image mode may include a plurality of image capturing modes.

The shutter button 462 is an image capturing start unit for a photographer to issue an image capturing preparation instruction and an image capturing instruction and includes the first shutter switch 463 and the second shutter switch 464.

The first shutter switch 463 is turned ON when the shutter button 462 provided in the digital camera 400 is in the middle of operation, i.e., the shutter button 462 is half-pressed (the image capturing preparation instruction, and first shutter switch 463 generates a first shutter switch signal SW1.

An image capturing preparation operation such as auto-focus (AF) processing, AE processing, and AWB processing is started in response to the first shutter switch signal SW1.

The second shutter switch 464 is turned ON upon completion of the operation of the shutter button 462, i.e., when the shutter button 462 is fully pressed (the image capturing instruction), and the second shutter switch 464 generates a second shutter switch signal SW2.

The system control unit 420 reads out the analog signal from the image capturing unit 411 and controls signal conversion processing to be performed by the A/D converter 412 and the image processing unit 413, based on the second shutter switch signal SW2.

Further, the system control unit 420 starts an image capturing processing operation up to writing the image data temporarily stored in the memory 421 to the storage medium 600 described below.

The touch panel 465 is a device that detects a touch or drag operation performed by a photographer.

The touch panel 465 is integrated with the rear surface display unit 450, and the photographer can operate the touch panel 465 by touching the display portion of the rear surface display unit 450 with a finger.

The power supply switch 466 is a switch for switching ON/OFF of the power supply. The power supply control unit 431 controls the power supply from the power supply unit 430 by a switching operation on the power supply switch 466.

A heat dissipation fan 470 is controlled by the system control unit 420 and cools the heat generating source inside the digital camera 400.

The lens unit 500 is an interchangeable lens that can be attached to and detached from the digital camera 400.

The lens 501 is a lens group that generates an optical image (an object image) from object light reflected by an object and includes a plurality of lenses, but one lens is illustrated in FIG. 4 for the sake of simplification.

The lens communication terminal 506 is a communication terminal for the lens unit 500 to communicate with the digital camera 400.

When the lens communication terminal 506 is electrically connected to the communication terminal 440, the lens unit 500 can communicate with the system control unit 420 that controls the entire digital camera 400, as described above.

Accordingly, the system control unit 420 can communicate with a lens system control circuit 505, a diaphragm drive circuit 504, and a lens drive circuit 502, and control the position of a diaphragm 503 and the focus state of a real image by shifting the lens 501.

The storage medium 600 is a storage medium such as a memory card that can be attached to and detached from the digital camera 400 and stores a captured image.

Examples of the storage medium 600 include a secure digital (SD) card, an of memory that retains data in the absence of a power supply such as a FLASH® memory, and a hard disk.

As described above, the image capturing apparatus 400 according to the present exemplary embodiment includes the heat dissipation fan 470 (i.e., a fan 130) that generates an airflow for cooling the image capturing element unit 106 and the foreign substance removal unit 200 that removes a foreign substance adhered to an exposed surface of the image capturing element 115 on the object side of the imaging plane.

The image capturing apparatus 400 according to the present exemplary embodiment includes the system control unit 420 (i.e., a control unit) that causes the foreign substance removal unit 200 to remove a foreign substance adhered to the exposed surface after the heat dissipation fan 130 is driven.

The ventilation opening 131a (FIG. 3B) of the heat dissipation fan 130 faces an area sandwiched between the image capturing element unit 106 (i.e., an image capturing element board) on which the image capturing element 115 is mounted and the main board 107 (i.e., a control board) on which the control IC 107a (i.e., a control circuit) for controlling the image capturing element 115 is mounted.

Description of Flowchart Illustrating First Operation Timing

Figure 5:
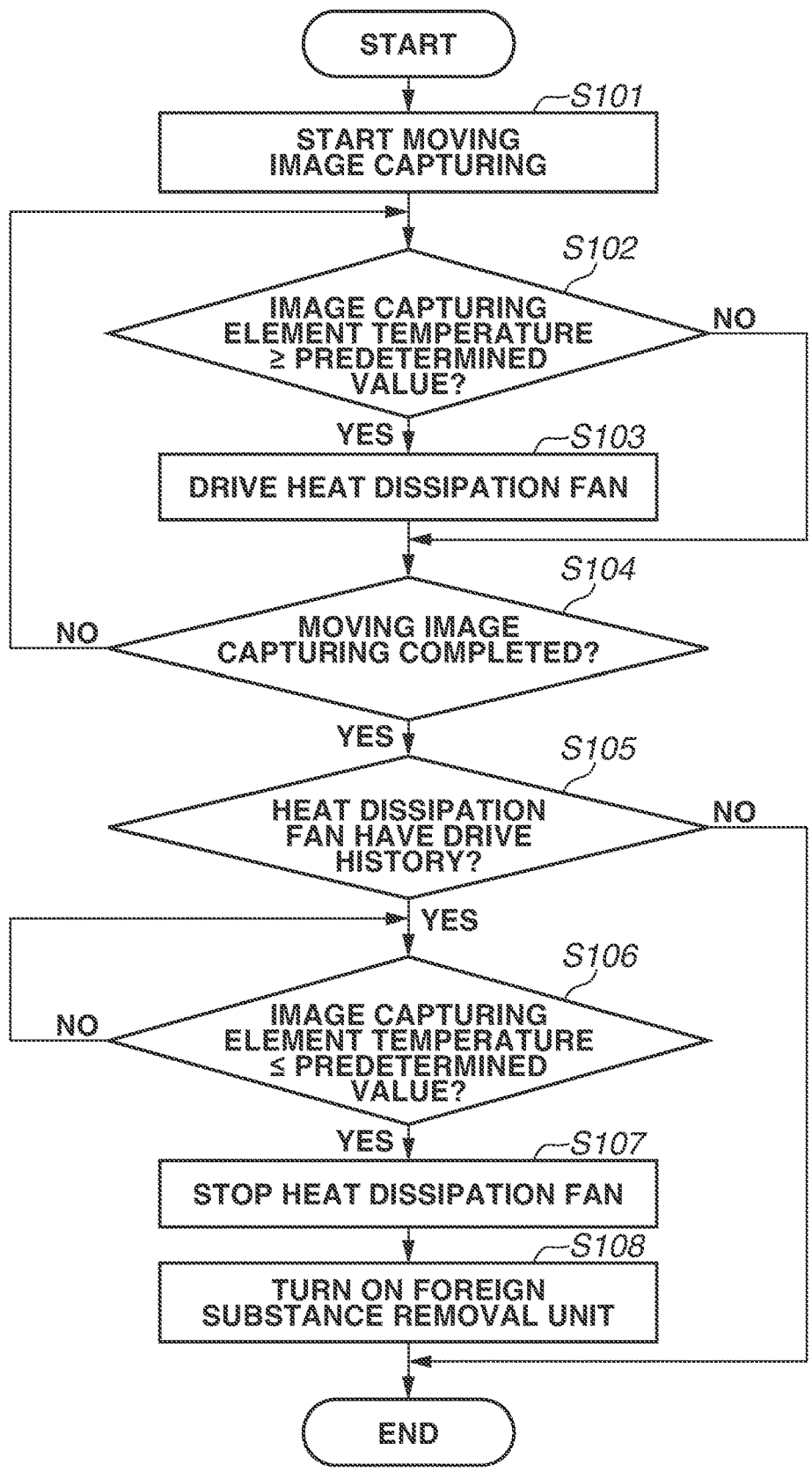
FIG. 5 is a flowchart illustrating operation timing of a foreign substance removal unit according to the exemplary embodiment of the present disclosure.

FIG. 5 is a flowchart illustrating first operation timing of foreign substance removal in the image capturing apparatus 400 according to the present disclosure.

In step S101, in a case where the shutter button 462 is pressed in a state in which the mode changeover switch 461 is set to the moving image mode, moving image capturing is started.

If the moving image capturing is started, the temperature of the image capturing element 115 rises as time passes.

In step S102, the temperature of the image capturing element 115 is monitored to determine whether the temperature of the image capturing element 115 has reached a predetermined value set in advance so that the temperature of the image capturing element 115 does not exceed the operation guarantee temperature of the image capturing element 115.

In step S102, in a case where it is determined that the temperature of the image capturing element 115 exceeds the predetermined value (YES in step S102), the processing proceeds to step S103, and driving of the heat dissipation fan 130 is started. In a case where it is determined that the temperature of the image capturing element 115 does not exceed the predetermined value (NO in step S102), the processing proceeds to step S104.

In step S103, the heat dissipation fan 130 is driven, and the air (airflow) inside the image capturing apparatus 400 circulates thereby, and the image capturing element 115 is cooled by the circulation of the air. At the same time, dust inside the image capturing apparatus 400 is also stirred up and adheres to the cover glass 115g of the image capturing element 115 to some extent.

In step S104, it is determined whether the moving image capturing is completed. In a case where the moving image capturing is completed (YES in step S104), the processing proceeds to step S105, whereas in a case where the moving image is still in process (NO in step S104), the processing returns to step S102, and the processing in steps S102 to S104 is repeated.

In step S105, it is determined whether the heat dissipation fan 130 has a drive history. In a case where the heat dissipation fan 130 has the drive history (YES in step S105), the processing proceeds to step S106, whereas in a case where the heat dissipation fan 130 does not have the drive history (NO in step S105), the processing in the present flowchart is terminated.

In step S106, the temperature of the image capturing element 115 is monitored to determine whether the temperature of the image capturing element 115 is the predetermined value set in advance or less, that is, whether the temperature of the image capturing element 115 is sufficiently lowered.

In step S106, in a case where it is determined that the temperature of the image capturing element 115 is the predetermined value or less (YES in step S106), the processing proceeds to step S107, and driving of the heat dissipation fan 130 is stopped.

In step S108, the system control unit 420 applies the predetermined frequency voltage to the piezoelectric element 115h to operate the vibration unit 200.

Accordingly, the dust adhered to the cover glass 115g is shaken off at step S108, and the image capturing apparatus 400 can prepare for the next image capturing.

In the present flowchart, the foreign substance removal unit 200 is operated after the heat dissipation fan 130 is stopped, but the foreign substance removal unit 200 may be operated in a state in which the heat dissipation fan 130 is not stopped after the moving image capturing.

At the first operation timing, the foreign substance removal unit 200 is operated after the moving image capturing is stopped. In addition, the foreign substance removal unit 200 is operated after the heat dissipation fan 130 is stopped.

Description of Flowchart illustrating Second Operation Timing

Figure 6:
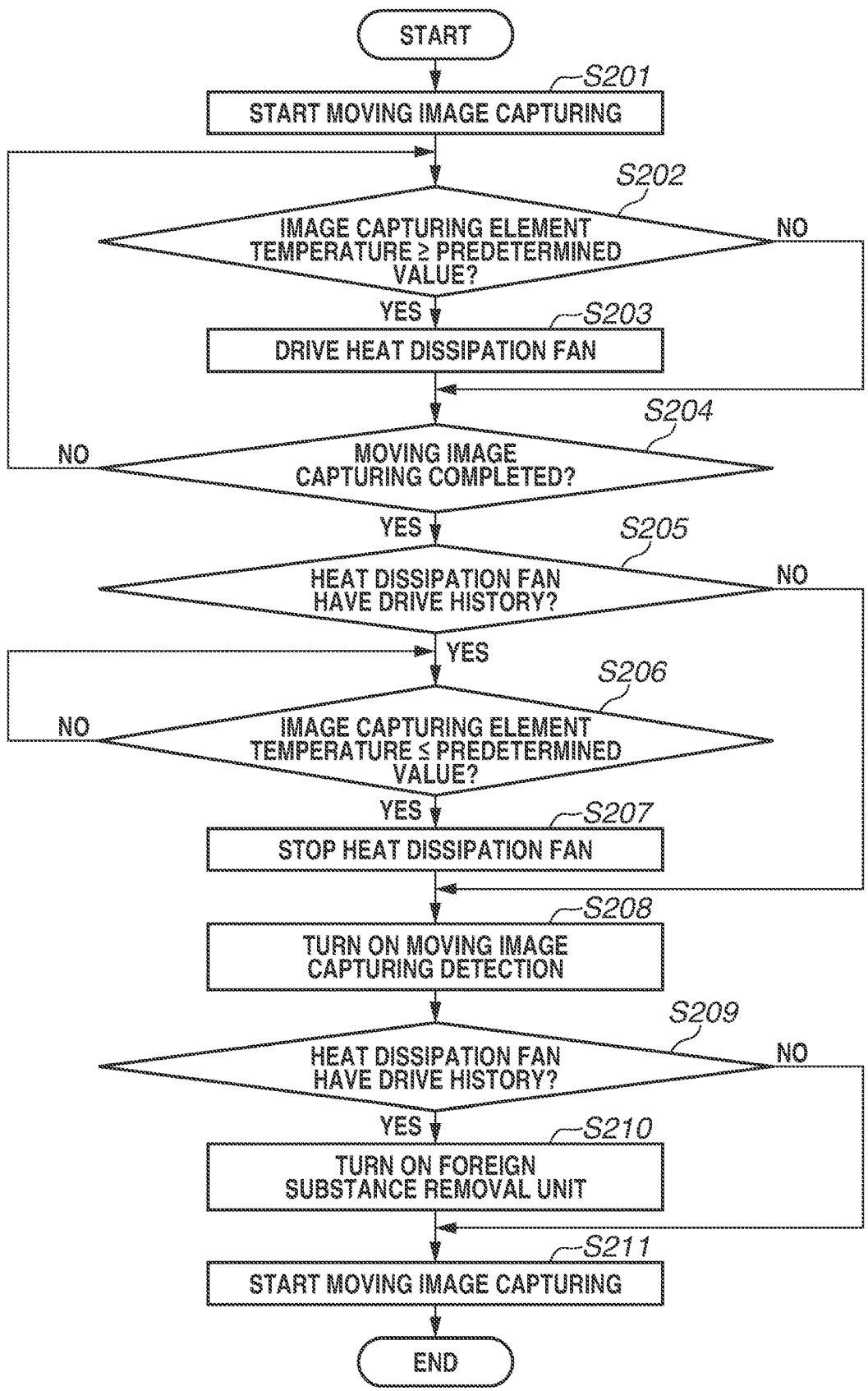
FIG. 6 is a flowchart illustrating another operation timing of the foreign substance removal unit according to the exemplary embodiment of the present disclosure.

FIG. 6 is a flowchart illustrating operation timing different from the operation timing of the foreign substance removal illustrated in FIG. 5 in the image capturing apparatus 400 according to the present disclosure.

Processing in steps S201 to S207 is the same as the processing in steps S101 to S107 in the flowchart of the operation timing in FIG. 5, and thus the description thereof is omitted.

In step S208, if the shutter button 462 is pressed again after the moving image capturing is stopped (moving image capturing detection of an instruction to start moving image capturing is turned ON), the processing proceeds to step S209. In step S209, it is determined whether the heat dissipation fan 130 has the drive history.

In a case where the heat dissipation fan 130 has the drive history (YES in step S209), the processing proceeds to step S210, whereas in a case where the heat dissipation fan 130 does not have the drive history (NO in step S209), the processing proceeds to step S211.

In step S210, the system control unit 420 applies the predetermined frequency voltage to the piezoelectric element 115h to operate the vibration unit 200.

Accordingly, the dust adhered to the cover glass 115g is shaken off.

After the foreign substance removal unit 200 is operated, the processing proceeds to step S211. Then in step S211, the moving image capturing is started.

In the flowchart of the operation timing in FIG. 5, the foreign substance removal unit 200 is operated after the moving image capturing operation is completed.

However, it can be assumed that some vibration or impact is applied to the image capturing apparatus 400 during a period after the operation of the foreign substance removal unit 200 until the start of the next moving image capturing, and the dust inside the image capturing apparatus 400 is stirred up thereby and adheres again to the cover glass 115g.

According to the operation timing in the present flowchart of FIG. 6, the foreign substance removal unit 200 is operated immediately before the moving image capturing, and thus it is possible to reduce a risk of deterioration in image quality caused by the dust adhered to the cover glass 115g.

At the second operation timing, the operation of the foreign substance removal unit 200 is started upon detecting an instruction to start the moving image capturing.

Description of Flowchart Illustrating Third Operation Timing

Figure 7:
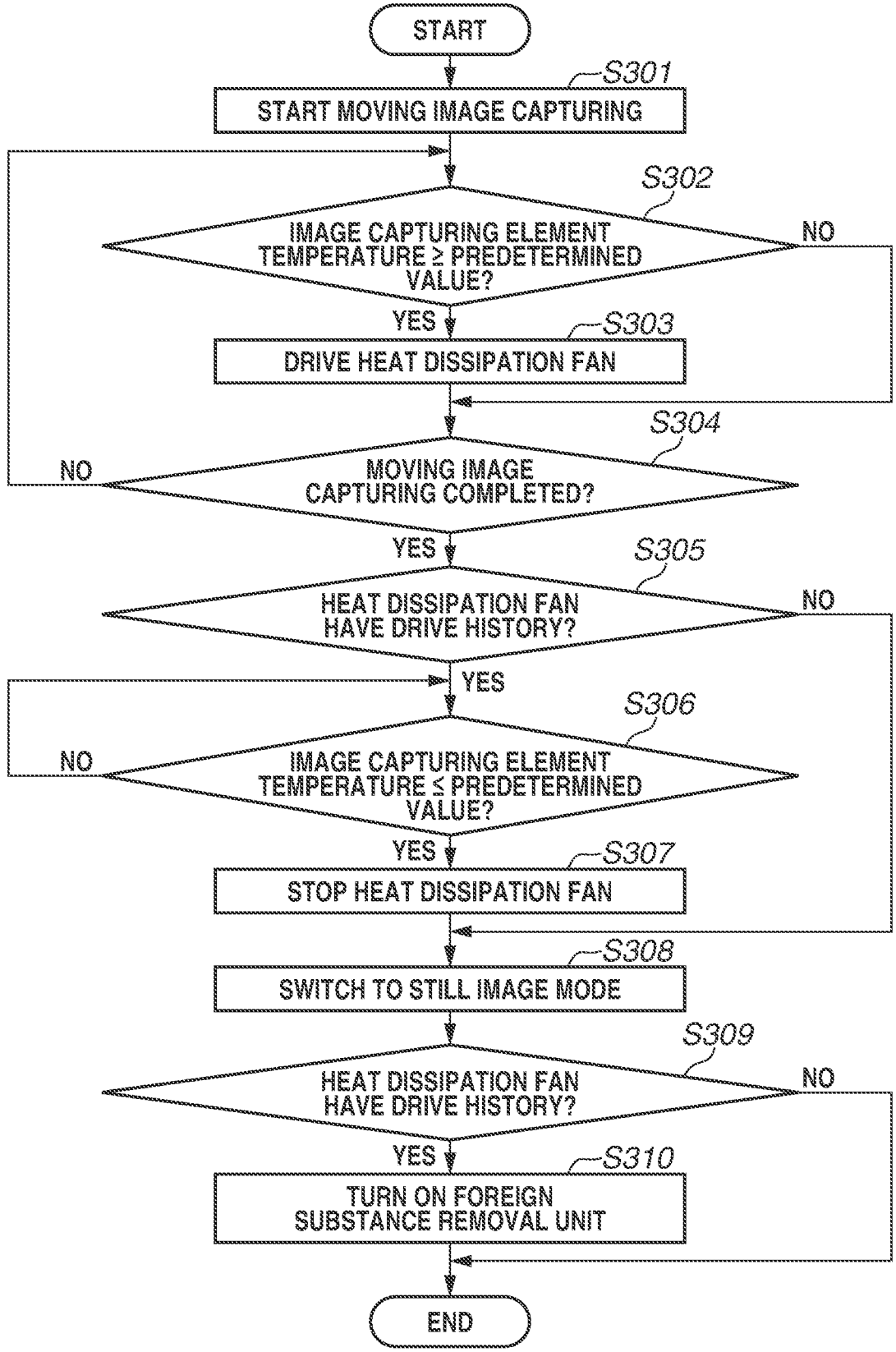
FIG. 7 is a flowchart illustrating another operation timing of the foreign substance removal unit according to the exemplary embodiment of the present disclosure.

FIG. 7 is a flowchart illustrating operation timing different from the operation timings of the foreign substance removal illustrated in FIGS. 5 and 6 in the image capturing apparatus 400 according to the present disclosure.

Processing in steps S301 to S307 is the same as the processing in steps S101 to S107 in the flowchart of the operation timing in FIG. 5, and thus the description thereof is omitted.

In step S308, if the moving image mode is switched to the still image mode by the mode changeover switch 461, the processing proceeds to step S309. Then in step S309, it is determined whether the heat dissipation fan 130 has the drive history.

In a case where the heat dissipation fan 130 has the drive history (YES in step S309), the processing proceeds to step S310, whereas in a case where the heat dissipation fan 130 does not have the drive history (NO in step S309), the processing in the present flowchart is terminated.

In step S310, the system control unit 420 applies the predetermined frequency voltage to the piezoelectric element 115h to operate the vibration unit 200.

Accordingly, the dust adhered to the cover glass 115g is shaken off, and the image capturing apparatus 400 can prepare for still image capturing.

The dust adhered to the cover glass 115g greatly affects image quality in still image capturing compared to moving image capturing. Thus, it is very effective to remove the dust from the cover glass 115g before still image capturing.

At the third operation timing, the operation of the foreign substance removal unit 200 is started upon detecting an instruction to start the still image capturing.

Description of Flowchart Illustrating Fourth Operation Timing

Figure 8:
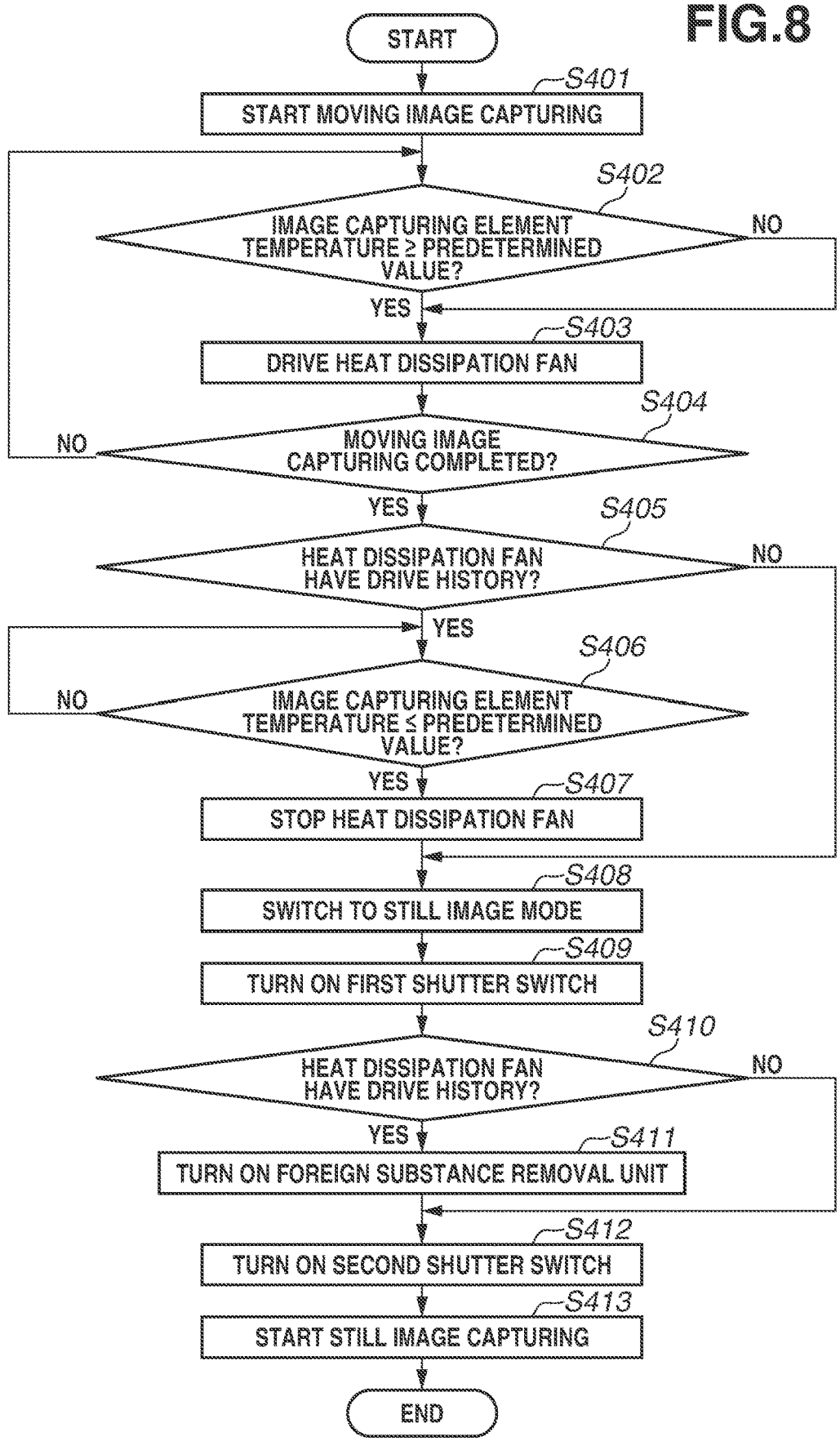
FIG. 8 is a flowchart illustrating another operation timing of the foreign substance removal unit according to the exemplary embodiment of the present disclosure.

FIG. 8 is a flowchart illustrating operation timing different from the operation timings of the foreign substance removal illustrated in FIGS. 5, 6, and 7 in the image capturing apparatus 400 according to the present disclosure.

Processing in steps S401 to S407 is the same as the processing in steps S101 to S107 in the flowchart of the operation timing illustrated in FIG. 5, and thus the description thereof is omitted.

In step S408, the moving image mode is switched to the still image mode by the mode changeover switch 461.

Subsequently, in step S409, if the first shutter switch 463 of the shutter button 462 is pressed, then in step S410, it is determined whether the heat dissipation fan 130 has the drive history.

In a case where the heat dissipation fan 130 has the drive history (YES in step S410), the processing proceeds to step S411, whereas in a case where the heat dissipation fan 130 does not have the drive history (NO in step S410), the processing proceeds to step S412.

In step S411, the system control unit 420 applies the predetermined frequency voltage to the piezoelectric element 115h to operate the vibration unit 200.

Accordingly, the dust adhered to the cover glass 115g is shaken off.

In step S412, if the second shutter switch 464 is pressed, the processing proceeds to step S413. In step S413, the still image capturing is started.

In the flowchart of the operation timing in FIG. 7, foreign substance removal is performed at the timing of switching to the still image mode.

However, it can be assumed that some vibration or impact is applied to the image capturing apparatus 400 during a period after the operation of the foreign substance removal unit 200 until the start of the still image capturing, and the dust inside the image capturing apparatus 400 is stirred up thereby and adheres again to the cover glass 115g.

According to the operation timing in the present flowchart of FIG. 8, the foreign substance removal unit 200 is operated immediately before the still image capturing, and thus it is possible to reduce a risk of deterioration in image quality caused by the dust adhered to the cover glass 115g.

At the fourth operation timing, the operation of the foreign substance removal unit 200 is started upon detecting an instruction to start the still image capturing.

Description of Flowchart Illustrating Fifth Operation Timing

Figure 9:
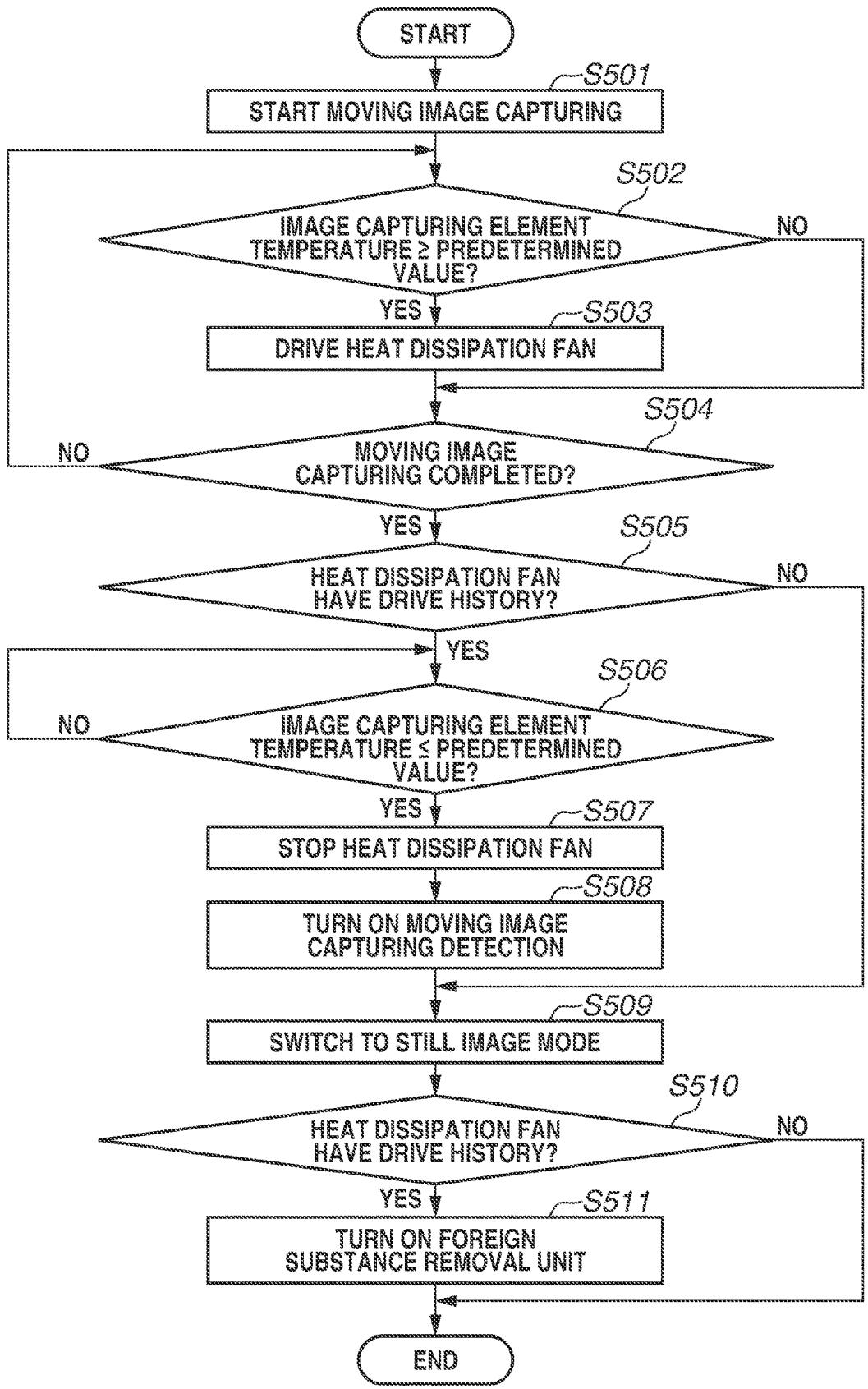
FIG. 9 is a flowchart illustrating another operation timing of the foreign substance removal unit according to the exemplary embodiment of the present disclosure.

FIG. 9 is a flowchart illustrating operation timing different from the operation timings of the foreign substance removal illustrated in FIGS. 5, 6, 7 and 8 in the image capturing apparatus 400 according to the present disclosure.

Processing in steps S501 to S508 is the same as the processing in steps S101 to S108 in the flowchart of the operation timing in FIG. 5, and thus the description thereof is omitted.

In step S509, if the moving image mode is switched to the still image mode by the mode changeover switch 461, the processing proceeds to step S510. In step S510, it is determined whether the heat dissipation fan 130 has the drive history.

In a case where the heat dissipation fan 130 has the drive history (YES in step S510), the processing proceeds to step S511, whereas in a case where the heat dissipation fan 130 does not have the drive history (NO in step S510), the processing in the present flowchart is terminated.

In step S511, the system control unit 420 applies the predetermined frequency voltage to the piezoelectric element 115h to operate the vibration unit 200.

In the present flowchart, the foreign substance removal is performed at both of the timing after the moving image capturing is completed and the timing of switching to the still image mode respectively.

Accordingly, it is possible to remove the dust adhered again to the cover glass 115g due to some vibration or impact applied to the image capturing apparatus 400 during a period from when the foreign substance removal is performed after the moving image capturing until when the moving image mode is switched to the still image mode.

The operation of the foreign substance removal unit 200 that is performed after switching to the still image mode may be performed after pressing of the first shutter switch 463 described with reference to FIG. 8.

At the fifth operation timing, the foreign substance removal unit 200 is operated at the timing after stopping the moving image capturing and at the timing after switching to the still image mode and before starting the still image capturing.

The exemplary embodiments are described above, but the descriptions of the above-described exemplary embodiments and modifications are examples for describing the technique according to the present disclosure.

The technique according to the present disclosure can be implemented by appropriately changing or combining the above-described exemplary embodiments and modifications without departing from the spirit and the scope of the present disclosure.

Specifically, the present disclosure is not limited to a digital camera and can be widely applied to an electronic device and an image capturing apparatus having a moving image capturing function such as a video camera and a network camera.

The technique according to the present disclosure is applied to an electronic device and an image capturing system.

According to an aspect of the present invention, a fan can efficiently remove a foreign substance such as dust adhered to an imaging surface at more effective timings.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-185818, filed Nov. 15, 2021, which is hereby incorporated by reference herein in its entirety.

What is claimed is:

1. An image capturing apparatus comprising:
an image capturing element configured to capture an image;
a fan configured to generate airflow for cooling the image capturing element;
a foreign substance remover having structure configured to remove a foreign substance from an exposure surface of a cover glass of the image capturing element on an object side of an imaging plane; and
a controller configured to perform control,
wherein the controller performs control to drive the fan and cause the image capturing element to capture an image while driving the fan, and then the controller performs control to turn on the foreign substance remover to remove a foreign substance adhered to the exposure surface of the cover glass after driving and then stopping the fan, and
wherein the controller performs control to turn on the foreign substance remover in a case where the fan has a drive history and perform control not to turn on the foreign substance remover in a case where the fan does not have a drive history.

2. The image capturing apparatus according to claim 1, wherein a ventilation opening of the fan faces an area between the image capturing element board on which the image capturing element is mounted and a control board on which a control circuit for controlling the image capturing element is mounted.

3. The image capturing apparatus according to claim 1, wherein operation of the foreign substance remover is performed after moving image capturing is stopped.

4. The image capturing apparatus according to claim 1, wherein operation of the foreign substance remover is started upon detecting an instruction to start moving image capturing.

5. The image capturing apparatus according to claim 1, further comprising an image capturing mode switch configured to switch between a moving image mode to perform moving image capturing and a still image mode to perform still image capturing,
wherein, in a case where it is determined, after performing the moving image capturing in the moving image mode and stopping the fan, that the moving image mode is switched to the still image mode by the image capturing mode switch before the controller performs control to turn on the foreign substance remover, the controller performs control to turn on the foreign substance remover after switching to the still image mode and before performing the still image capturing in the still image mode.

6. The image capturing apparatus according to claim 5, further comprising a shutter button having a first shutter switch configured to issue an image capturing preparation instruction when half-pressed and a second shutter switch configured to issue an image capturing instruction when fully pressed,
wherein, in turning on the foreign substance remover after switching to the still image mode, the controller is configured to perform control to turn on the foreign substance remover after it is determined that the first shutter switch of the shutter button is pressed and before the second shutter switch is pressed.

7. The image capturing apparatus according to claim 1, wherein operation of the foreign substance remover is performed after stopping moving image capturing and switching to a still image mode and before performing still image capturing.

8. The image capturing apparatus according to claim 1, wherein, in a case where image capturing detection is turned on as an instruction to start a second image capturing after a first image capturing and operation of the fan are stopped, the controller (i) performs control, immediately before starting the second image capturing, to turn on the foreign substance remover to remove a foreign substance adhered to the exposure surface of the cover glass, and then (ii) performs control to start the second image capturing after the foreign substance remover is operated.

9. The image capturing apparatus according to claim 8, wherein the controller (i) performs control, immediately before starting the second image capturing, to turn on the foreign substance remover to remove a foreign substance adhered to the exposure surface of the cover glass only if it is determined that the fan has a drive history.

10. The image capturing apparatus according to claim 8, further comprising an image capturing mode switch configured to switch between a moving image mode to perform moving image capturing and a still image mode to perform still image capturing, wherein, in causing the image capturing element to capture the image while driving the fan, the controller causes the image capturing element to capture a first moving image, wherein, in a case where (i) moving image capturing detection is turned on as an instruction to start a second moving image capturing after the first image capturing and operation of the fan are stopped, and (ii) in a case where it is determined that the moving image mode is switched to the still image mode by the image capturing mode switch before the controller performs control to turn on the foreign substance remover, the controller performs control to turn on the foreign substance remover after the moving image capturing is completed and a timing of switching to the still image mode respectively, and before performing the still image capturing in the still image mode.

11. The image capturing apparatus according to claim 10, wherein the controller (i) performs control, immediately before starting a second image capturing, to turn on the foreign substance remover to remove a foreign substance adhered to the exposure surface of the cover glass only if it is determined that the fan has a drive history.

12. The image capturing apparatus according to claim 1, wherein the structure of the foreign substance remover includes a piezoelectric element attached to the cover glass and configured to be vibrated from receiving a frequency voltage to cause foreign substance to be shaken off from the cover glass.

13. The image capturing apparatus according to claim 1,
   wherein the image capturing element includes an image capturing board, an image capturing element holding member having an opening portion and an elastomer integrally formed around the entire peripheral edge portion of the opening portion, and an urging member to urge and fix the foreign substance remover to the image capturing board, and
   wherein the urging member and the elastomer of the image capturing element holding member form a sealed space for preventing a foreign substance from entering in the image capturing element.

14. The image capturing apparatus according to claim 1, wherein the cover glass resides between an urging member and a light shielding member of the image capturing element, is coated with an optical coating, and is fixed to a piezoelectric element to form the foreign substance remover.

15. The image capturing apparatus according to claim 1, wherein the foreign substance adhered to the exposure surface of the cover glass is from operation of the fan.

* * * * *